United States Patent
Yamanaka

(10) Patent No.: US 7,870,571 B2
(45) Date of Patent: Jan. 11, 2011

(54) DISC GUIDE OF DISC CARRYING DEVICE

(75) Inventor: Takashi Yamanaka, Tokyo (JP)

(73) Assignee: Tanashin Denki Co., Ltd., Tokyo (JP)

( * ) Notice: Subject to any disclaimer, the term of this patent is extended or adjusted under 35 U.S.C. 154(b) by 621 days.

(21) Appl. No.: 11/987,024

(22) Filed: Nov. 27, 2007

(65) Prior Publication Data

US 2008/0134225 A1    Jun. 5, 2008

(30) Foreign Application Priority Data

Nov. 30, 2006    (JP)    ............... 2006-322857

(51) Int. Cl.
    G11B 17/04    (2006.01)
(52) U.S. Cl. .................................... 720/624
(58) Field of Classification Search ......... 720/619–624, 720/646
    See application file for complete search history.

(56) References Cited

U.S. PATENT DOCUMENTS

| | | | | |
|---|---|---|---|---|
| 4,507,768 | A * | 3/1985 | Ikedo et al. ................ | 720/624 |
| 5,220,552 | A * | 6/1993 | Yokoi et al. ................ | 720/646 |
| 5,719,844 | A * | 2/1998 | Abe ........................... | 720/625 |
| 5,978,339 | A * | 11/1999 | Sasaki et al. .............. | 720/646 |
| 6,411,583 | B1 * | 6/2002 | Yamamoto et al. .......... | 720/647 |
| 6,779,190 | B2 * | 8/2004 | Akatani et al. ............. | 720/624 |
| 6,910,217 | B2 * | 6/2005 | Kan-o ....................... | 720/646 |
| 7,047,539 | B2 * | 5/2006 | Miyagi ...................... | 720/646 |
| 7,281,256 | B2 * | 10/2007 | Huang ........................ | 720/624 |
| 7,308,692 | B2 * | 12/2007 | Kasama et al. ............. | 720/625 |
| 7,401,342 | B2 * | 7/2008 | Kasama et al. ............. | 720/622 |
| 7,437,745 | B2 * | 10/2008 | Seol .......................... | 720/624 |
| 7,454,768 | B2 * | 11/2008 | Yasaki et al. ............... | 720/624 |
| 7,496,936 | B2 * | 2/2009 | Fujimura et al. ........... | 720/646 |
| 2005/0193401 | A1 * | 9/2005 | Lin et al. ................... | 720/624 |
| 2007/0186223 | A1 * | 8/2007 | Mitsumoto .................. | 720/646 |

FOREIGN PATENT DOCUMENTS

| | | |
|---|---|---|
| JP | 2000-057665 | 2/2000 |
| JP | 2002-298481 | 10/2002 |
| JP | 2003-077198 | 3/2003 |
| JP | 2004-055040 | 2/2004 |
| JP | 2004-139640 | 5/2004 |
| JP | 2004-506542 | 10/2004 |
| JP | 2005-302187 | 10/2005 |

* cited by examiner

Primary Examiner—Brian E Miller
(74) Attorney, Agent, or Firm—Clark & Brody

(57) ABSTRACT

An object of the present invention is to provide a disc guide of a disc carrying device composed of a guide plate made from a metal plate and guide projections made of a synthetic resin, and that can be easily produced at low cost. Multiple positioning holes where a large hole communicates into a small hole and step differences are arranged in the guide plate made from a metal plate, respectively; multiple engagement projections having a stopper with a large diameter at the end are arranged in the right and left guide projections made of a synthetic resin having a taper surface, respectively; after the stopper is inserted into the corresponding large hole while the inner end of each guide projection is overlapped to the step difference, the guide projection is slid and the engagement projection is moved toward the small hole; the inner end of the guide projection is disengaged from the step difference and the slide along the reverse direction is prohibited by the step difference; and the disc guide is mounted to the guide plate.

2 Claims, 5 Drawing Sheets

F I G. 2
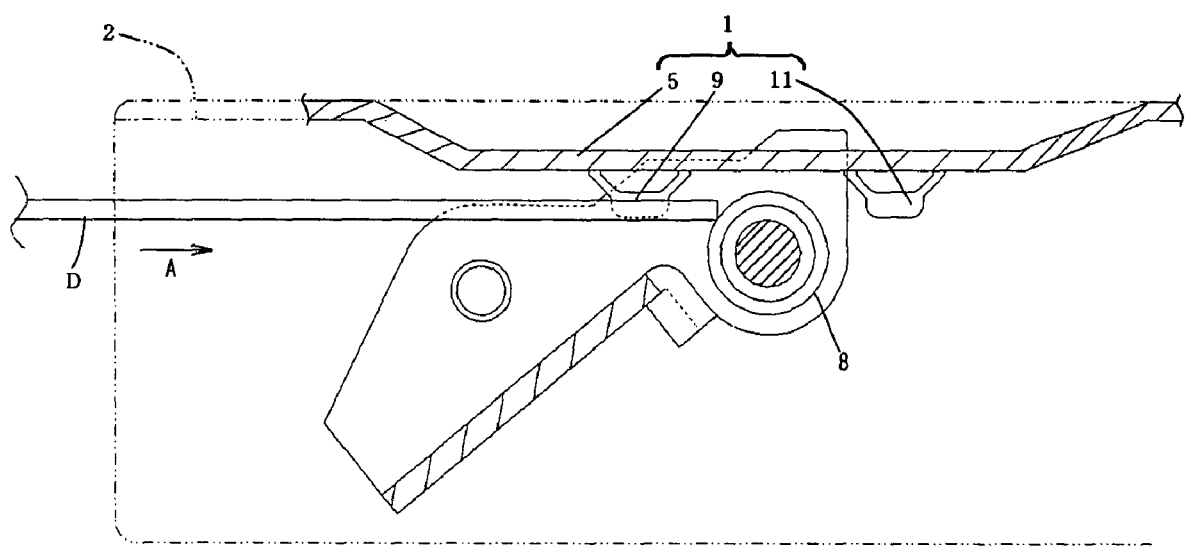

F I G. 3
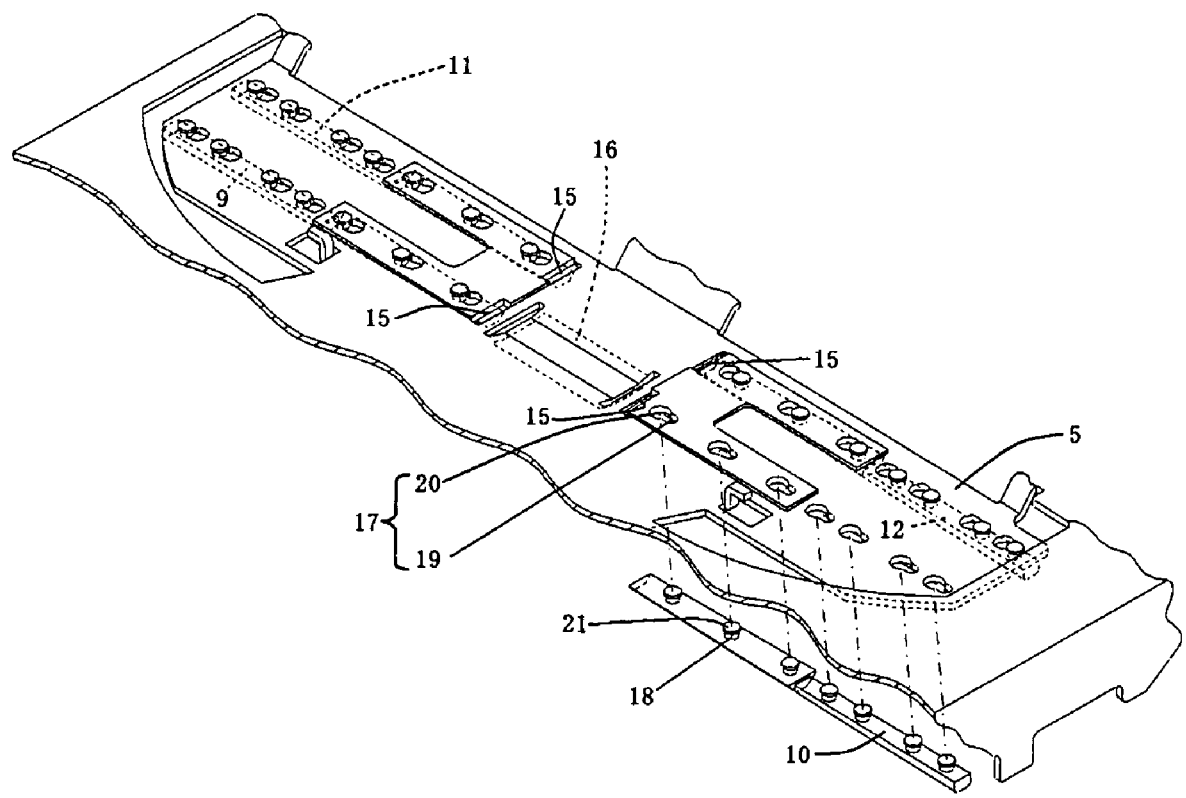

DISC GUIDE OF DISC CARRYING DEVICE

BACKGROUND OF THE INVENTION

1. Field of the Invention

The present invention relates to a disc guide of a disc carrying device where multiple guide projections made of a synthetic resin are secured on the surface of a chassis made from a metal plate.

2. Description of the Prior Art

In a disc carrying device, the device is designed to carry a disc due to the rotation of a carrying roller while the disc is held between a disc guide and a carrying roller.

In the disc guide, multiple guide projections are generally projected from the surface of a guide plate, designed to guide the disc while it is held between the guide projections and the carrying roller.

The paired guide projections are symmetrically arranged along a direction crosswise relative to the insertion direction of the disc, and surfaces that make contact with the disc are inclined so as to recede from the axial center line of the carrying roller; in other words, so as to recede from the disc surface, heading toward the center from the left and right ends of the guide plate, in order to avoid surface contact with the disc as much as possible by allowing only the outer circumferential edge to make contact with the guide projections, and also for guiding the disc, which is tilted toward the center.

Japanese Laid-Open Patent Publication 2003-77198 discloses a disc guide made from a metal plate where a guide plate and multiple guide projections (9) and (10) are integrally formed by press work.

Japanese Laid-Open Patent Publication 2002-298481 discloses a disc guide (41) where a guide plate and multiple projections (45), (46) and (47) are integrally formed with a synthetic resin.

The Journal of Technical Disclosure No. 2004-506542 issued by JIII (Japan Institute of Invention and Innovation), discloses the configuration of a disc guide where multiple disc guide projections made of a synthetic resin (referred to as "disc guides 9" in the journal of technical disclosure) are formed on a guide plate made from a metal plate (referred to as "guide plate 5" in the journal of technical disclosure) by outsert molding. In addition, it is designed such that a disc is held between the guide projections (9) of the disc guide 9 and a taper roller (8).

In Japanese Laid-Open Patent Publication 2003-77198, since the disc plate and guide projections are integrally formed with a metal plate, sliding of the disc relative to the guide projections is poor and the disc may not be smoothly carried. Moreover, there is another problem that since the disc makes contact with the metal guide projections, the disc can easily be damaged.

Further, in the configuration of Japanese Laid-open Patent Publication 2002-298481, because the guide plate is made of a synthetic resin, deformation, such as warping easily occurs at the time of molding and its strength is not sufficient, and when deformation occurs, the disc may not be smoothly carried.

In the Journal of Technical Disclosure No. 2004-506542, the guide plate is made from metal where deformation is difficult to occur and the guide projections are made of a synthetic resin, which is smoothly slidable. However, since the outsert molding is used, it is necessary to attach and secure the resin to a portion of the metal plate by molding. Hence, there is the problem that not only is molding difficult, but it is also costly.

The present invention has been accomplished by taking these problems into consideration, and an object of the present invention is to provide a disc guide of a disc carrying device where a metal plate is used as a guide plate, which is difficult to deform, and a synthetic resin, which is easily producible at low cost.

SUMMARY OF THE INVENTION

In the disc guide of a disc carrying device relating to the present invention where right and left guide projections that work with a carrying roller and hold a disc are projected from the surface of the guide plate, and surfaces of the guide projections that make contact with the disc are inclined so as to recede from the disc, heading toward the center of the guide plate from the right and left ends of the guide plate; it is designed such that the guide plate is made of a metal plate and the guide projections are made of a synthetic resin, and step differences adjacent to the right and left guide projections are arranged in the intermediate region of the guide plate, respectively.

Multiple positioning holes are arranged at sites overlapping the guide projections of the guide plate, respectively, and multiple engagement projections to be engaged with the positioning holes are arranged in the guide projections, respectively.

Each positioning hole has a configuration where a small hole, in which the engagement projection is fitted, communicates into a large hole, which is larger than the small hole, and the large hole is orientated toward the step difference side.

Each engagement projection has a stopper, where the large hole is insertable but the small hole is non-insertable, at the end.

After each stopper is inserted into the large hole while the end of each guide projection overlapped onto the step difference, the guide projection is slid along the guide plate and the engagement projection is moved toward the small hole side and the overlap of each guide projection, eliminating the step difference, and each guide projection is secured to the guide plate.

The shape and the dimension of all the guide projections may be the same.

According to the disc guide of a disc carrying device of the present invention, a metal plate, which is difficult to deform, is used for the guide plate, and a smoothly-slidable synthetic resin is used for the guide projections. In addition, the multiple guide projections made of a synthetic resin are easily mounted onto the guide plate by outsert molding, thereby obtaining the disc guide. Therefore, since a resin is not required to be attached and secured onto a portion of the metal plate by molding, molding can be easy and the disc guide can be produced at low cost.

Further, if the shape and the dimension of all the guide projections are the same, the guide projections can be produced by using a common metal mold; therefore, the production cost can be further lowered.

BRIEF DESCRIPTION OF THE DRAWINGS

The invention will become more apparent upon a reading of the following detailed description with reference to the accompanying drawings, in which:

FIG. 2 is an enlarged sectional side view of the disc guide periphery of the disc carrying device built into the disc player shown in FIG. 1, FIG. 3 is a partially-exploded perspective view showing the disc guide relating to the present invention.

DESCRIPTION OF THE PREFERRED EMBODIMENT

A preferred embodiment for implementing a disc guide 1 of the present invention is described hereafter, with reference to the drawings.

Figure 1:
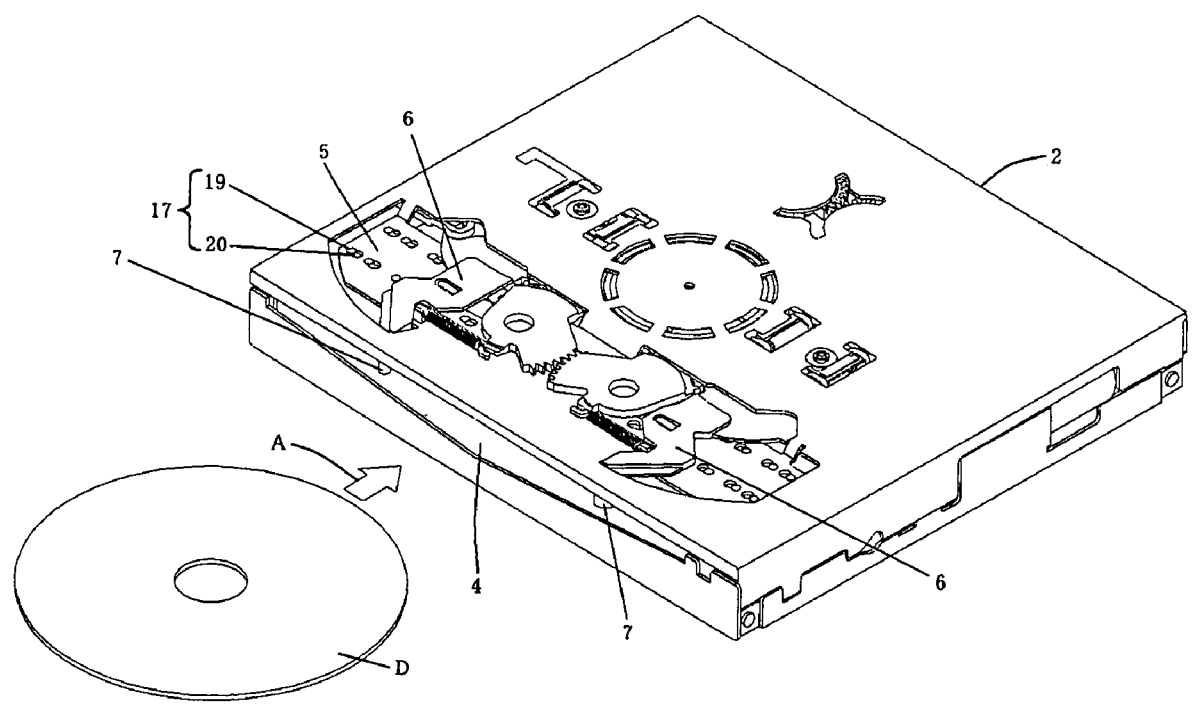
FIG. 1 is a perspective view showing an embodiment of a disc carrying device provided with the disc guide relating to the present invention built into a disc player.

FIG. 1 shows a disc player with a built-in disc carrying device. FIG. 2 is a sectional side view of the periphery of the disc guide 1. As shown in FIG. 1, a top panel is arranged in a metal external chassis 2 of the disc player, and a damper (not shown) is mounted to the lower surface side substantially in the center. Further, a turntable (not shown) is arranged at the lower side position of the clamper within the external chassis 2.

A disc insertion slot 4 is placed on the front panel of the external chassis 2. The symbol A in the figure represents an insertion direction of a disc D. Further, a portion of the top panel closer to the disc insertion slot 4 is partially concave as shown in FIG. 1, which portion is referred to as a guide plate 5.

When the disc D is inserted into the disc player from the disc insertion slot 4, the disc D is inserted while a detector 7 of a disc detecting member 6 is pushed, and the insertion of the disc D is detected due to a rotation of the disc detecting member 6 and a motor (not shown) is started. A carrying roller 8 that is arranged in a crosswise or orthogonal direction relative to the insertion direction A of the disc D and has a taper surface is rotated, and as shown in FIG. 2, the disc D reaches the carrying roller 8, and then, the disc D is guided while being held between the taper surface and the inclined surfaces of the four guide projections 9, 10, 11 and 12 (see FIG. 4) of the disc guide 1, and the disc D is carried to the position between the turntable (not shown) and the clamper due to the rotation of the carrying roller 8.

Furthermore, regarding the configuration of the taper surface of the carrying roller 8 to be in contact with the disc D, the taper surface is designed such that a roller peripheral surface is arranged along the longitudinal direction of the roller axis and the diameter becomes smaller toward the center region of the roller in order to avoid contact with the entire disc surface, and to make contact only with the peripheral edge of the disc from the view point of the disc surface protection, said configuration belonging to a well-known technology as the carrying roller.

Figure 4:
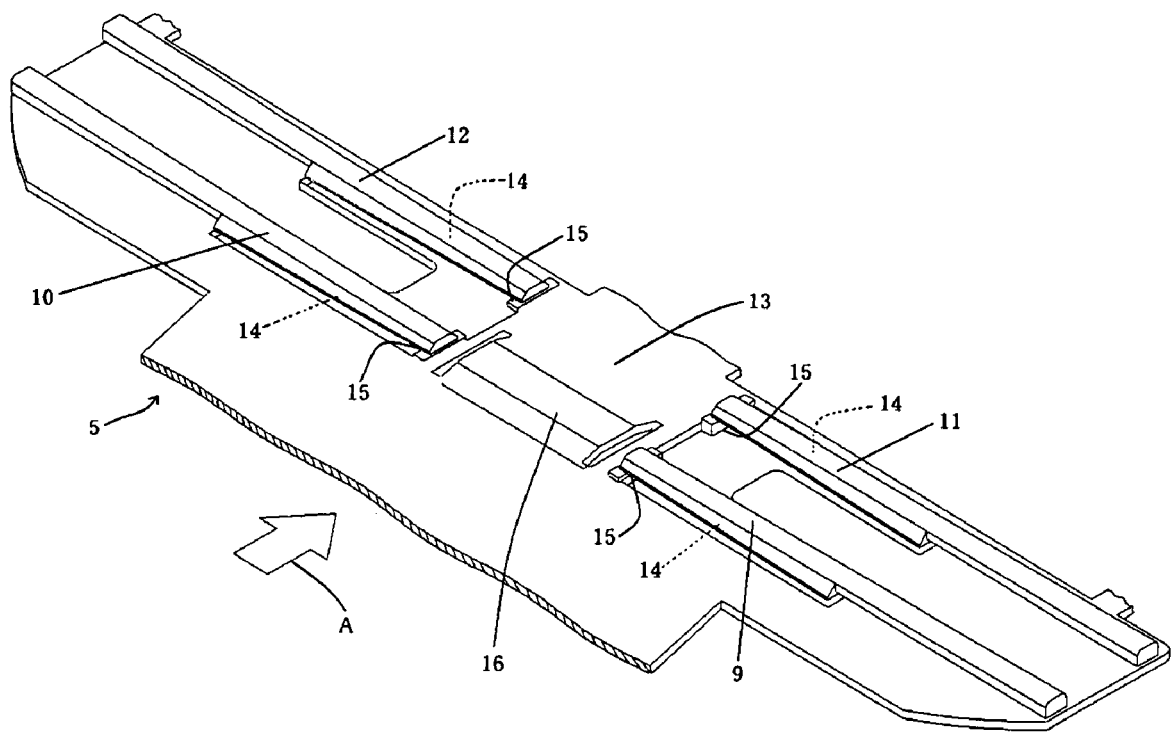
FIG. 4 is a perspective view of the turned-over disc guide shown in FIG. 3.

The four guide projections 9, 10, 11 and 12 are formed with a synthetic resin to have the same shape and dimension, and as shown in FIG. 2, are projected from the lower surface side of the guide plate 5, i.e. from the side facing against the carrying roller 8, using a mounting method described later. The disc guide 1 is composed of the guide plate 5 and guide projections 9, 10, 11 and 12. The guide projections 9, 10, 11 and 12 are arranged at the near side and far side positions of the carrying roller 8 as matched pairs as shown in FIGS. 3 and 4 by orthogonalizing their longitudinal direction relative to the insertion direction of the disc D. In FIG. 2, only the guide projections 9 and 11, which are situated at one of the sides, are shown.

FIG. 3 is a partially-exploded perspective view of the disc guide 1, and FIG. 4 is a perspective view of the turned-over disc guide 1. As shown in FIG. 3, the surfaces (lower surfaces) of the guide projections 9, 10, 11 and 12 that make contact with the disc are inclined downward, i.e., so as to recede from the axial center line of the carrying roller 8 as heading from the right and left ends toward the center of the guide plate 5. In other words, these guide projections are formed to have inclined surfaces, inclined toward the center or middle position of the guide plate 5 and gradually recede from the surface of the disc D. The configuration of the inclined surfaces plays a role to protect the disc surface by avoiding contact with the disc D with the entire surface, similar to the taper surface configuration of the carrying roller 8. The inclined surface configuration itself also belongs to the well-known technology.

A rectangular part 13 (FIG. 4) is arranged in the center at the lower surface side of the guide plate 5, and the paired guide projections 9, 10, 11 and 12 are mounted at guide projection mounting parts 14 on the right and left of the rectangular part 13, respectively. Each guide projection mounting part 14 is configured to have one-half the thickness of the guide plate 5, and the regions are formed to be lower by one step. Step differences 15 are also formed approximately on the center of the mounting surfaces of the guide plate 5 for the guide projections 9, 10, 11 and 12 along their longitudinal direction, respectively.

Step differences 15 are arranged between the rectangular part 13 and each of the guide projection mounting parts 14 in the intermediate site of the guide plate 5, respectively. The step differences 15 are adjacently arranged at the internal ends of the guide projections 9, 10, 11 and 12, respectively; in other words, at the ends where the matched pairs of the guide projections correspond in the center or the intermediate site of the guide plate 5, and are formed to be slightly shorter than the thickness or height of the guide projections at the adjacent ends. The step differences 15 are formed by lowering the regions of the guide projection mounting parts 14 by one step.

Further, as shown in FIG. 4, a one-half region at the near side of the rectangular part 13, i.e. at the front side along the disc insertion direction bulges downward, i.e. toward the side corresponding to the disc D to form a bulged part 16. The bulged part 16 is designed to have the same height as the internal ends of the guide projections 9, 10, 11 and 12, respectively. When a disc is carried, the bulged part 16 plays the role of making contact with the disc and guiding it. Especially, the bulged part 16 serves to effectively guide a disc whose diameter is smaller than the disc D when such smaller disc (not shown) is carried.

As shown in FIG. 3, multiple positioning holes 17 are arranged in line in the guide projection mounting parts 14 of the guide plate 5 along its longitudinal direction, respectively. In addition, multiple columnar engagement projections 18 to be engaged with the positioning holes 17 are arranged in the guide projections 9, 10, 11 and 12, respectively.

Each positioning hole 17 is composed of a small hole 19, where the engagement projection 18 is fitted, and a large hole 20 that communicates into this small hole 19 and is larger than the small hole 19, and these holes 19 and 20 are arranged along the longitudinal direction of the guide projection mounting part 14. Each large hole 20 is closer to the step difference 15.

Figure 5:
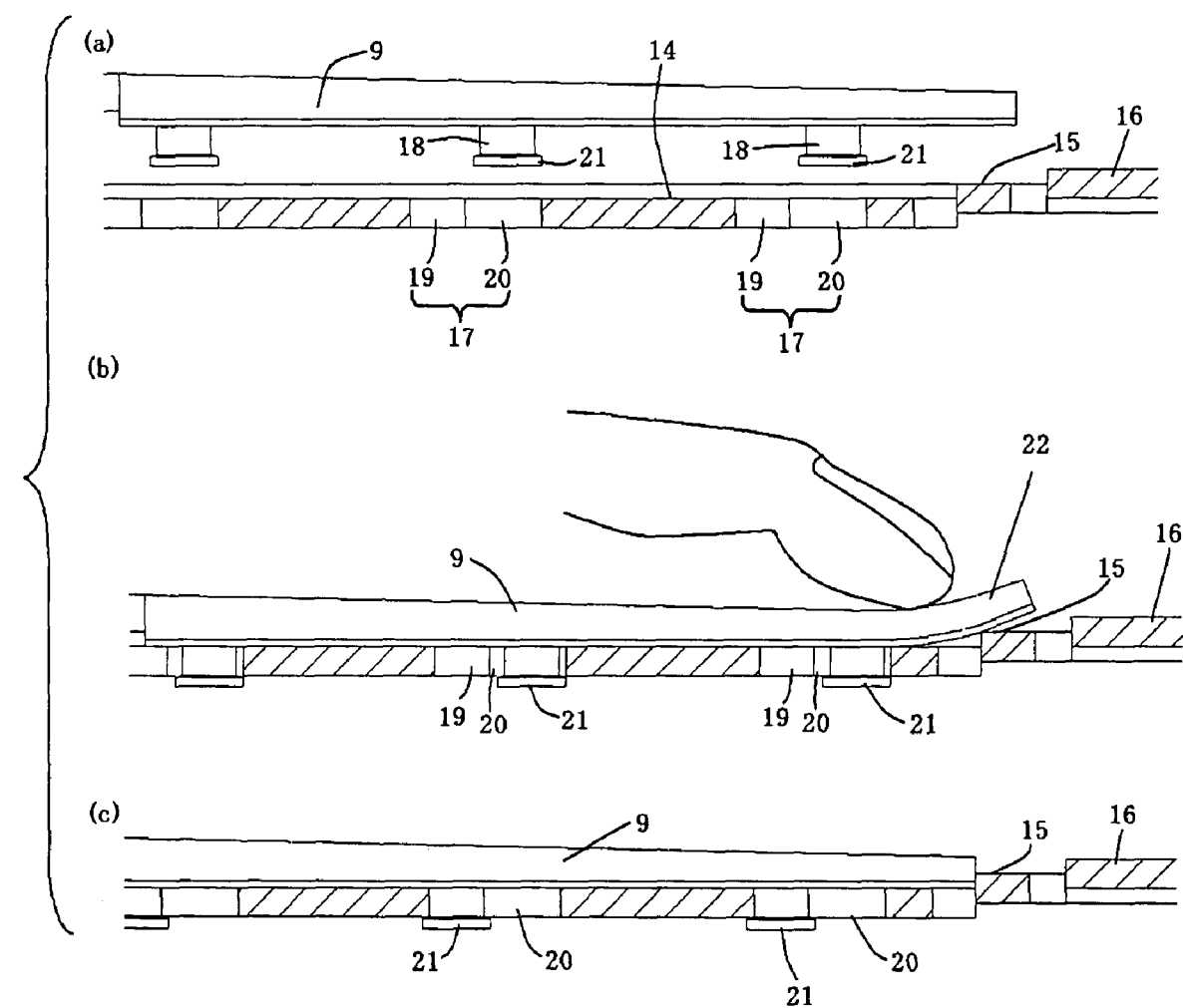
FIG. 5 is cross sectional views showing procedures to mount the guide projections onto the guide plate in (a), (b) and (c), respectively

FIGS. 5(a), (b) and (c) show procedures to mount each of the guide projections 9, 10, 11 and 12 onto the guide plate 5, and first, as shown in FIG. 5(a), stoppers 21 of the guide projections 9, 10, 11 and 12 (only the guide projection 9 is shown) are aligned with the large holes 20 of the corresponding positioning holes 17, respectively, and as shown in FIG. 5(b), an operator pushes the engagement projection 18, which is situated the closest to the internal end, i.e. at the end side corresponding to the center or the intermediate site of the guide plate 5 from above while an internal end 22 of the guide projection 9 is overlapped onto the step difference 15, and while the internal end 22 of the guide projection 9 is flexed, the stopper 21 is inserted into the large hole 20. Next, as shown in FIG. 5(c), the guide projection 9 is slid outward along the guide plate 5, i.e. toward the direction receding from the center or the middle position of the guide plate 5, and the engagement projection 18 is moved to the small hole 19. With this adjustment, the stopper 21 falls into the non-insertable situation not to be extracted from the small hole 19. At the time of this slide movement, the internal end of the guide projection 9 is disengaged from the step difference 15 and is elastically restored to the position shown in FIG. 5(c). Then, sliding of the guide projections 9, 10, 11 and 12 toward the reverse direction is prohibited and mounting to the guide plate 5 is completed.

Furthermore, in the completely mounted state, the step differences 15 and the guide projections 9, 10, 11, and 12 do not always adhere tightly, but it is permissible that a slight gap exists bwetween both components.

With the configuration described above, a metal plate, which is difficult to deform, is used for the guide plate 5, and a smoothly-slidable synthetic resin is used for the guide projections 9, 10, 11 and 12. In addition, the multiple guide projections 9, 10, 11 and 12 made of a synthetic resin are simply mounted onto the guide plate 5 using a mechanical assembly method, not relying upon the outsert molding, and the disc guide 1 can be obtained; therefore, the precision will be maintained and the disc guide 1 can be produced at lower cost.

If all the guide projections 9, 10, 11 and 12 are formed to have the same dimension and shape, each of the guide projections 9, 10, 11 and 12 can be produced with a common metal mold, and lower cost.

What is claimed is:

1. A disc guide (1) of a disc carrying device having
a guide plate (5),
a carrying roller (8) and
a pair of guide projections (9, 10, 11 and 12) projecting from the guide plate to guide a disc (D) in the held state in association with the carrying roller,
where surfaces of the guide projections making contact with the disc are inclined so as to recede from the disc as heading from right and left ends of the guide plate toward the center of the guide plate, comprising:
said guide plate being made from a metal plate, and the guide projections being made of a synthetic resin;
step differences (15) arranged to be adjacent to right and left guide projections in the intermediate site of the guide plate;
multiple positioning holes (17) arranged in the region overlapped with the guide projections of the guide plate, respectively;
multiple engagement projections (18) arranged in the guide projections to be engaged with the positioning holes, respectively;
each positioning hole being composed of a small hole (19) where an engagement projection (18) is fitted, and a large hole (20) that communicates into the small hole and is larger than the small hole, where the large hole is formed closer to the step difference side compared to the small hole; and
stoppers (21) arranged at the ends of the engagement projections to cause the large hole to be insertable and the small hole to be non-insertable, respectively,
whereby after each stopper is inserted into the large hole while the end of the guide projection is overlapped onto the step difference, the guide projection is slid along the guide plate, and the engagement projection is moved to the small hole, and the overlap of the guide projection and the step difference is eliminated, thereby each guide projection is secured to the guide plate.

2. The disc guide of a disc carrying device according to claim 1, wherein all the guide projections have the same shape and dimension.

\* \* \* \* \*